Aug. 26, 1941.        H. C. THOMPSON                2,254,095
              ELECTRON BEAM DISCHARGE DEVICE
              Original Filed July 5, 1935    4 Sheets-Sheet 1
*Fig. 1*     *Fig. 2*     *Fig. 3*     *Fig. 4*
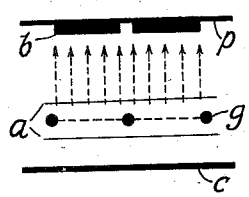 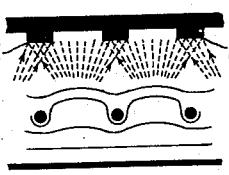 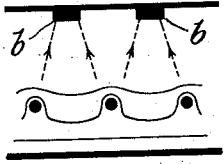 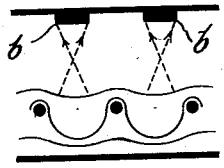
*Fig. 5*        *Fig. 7*              *Fig. 8*
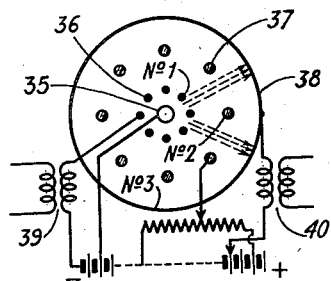   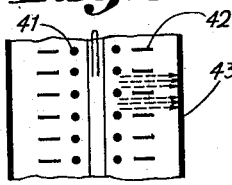   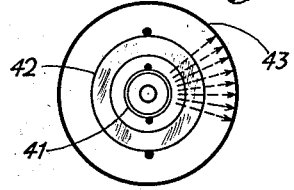
*Fig. 12*    *Fig. 9*
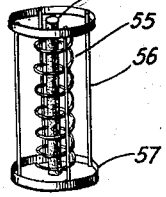  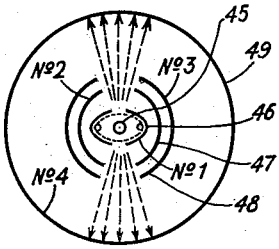
*Fig. 6*
N°3 VOLTS = 250
N°1 VOLTS = -3
PROJECTED AREA
N°2 = 25.9 PER CENT
*Fig. 13*
*Fig. 10*
N°2 VOLTS = 80
N°3 VOLTS = 250
N°4 VOLTS = 250
N°2 PROJECTED AREA
74 PER CENT
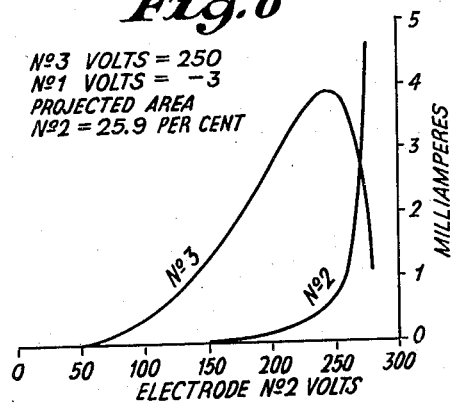
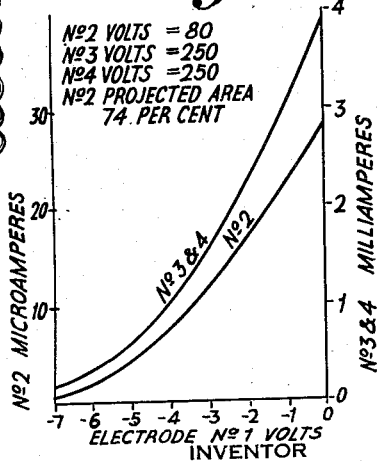
*Fig. 11*
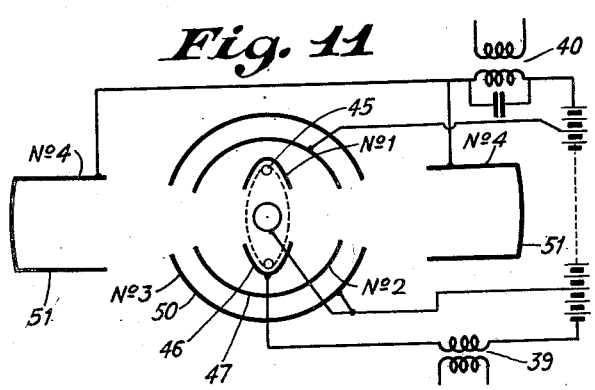
INVENTOR
HARRY C. THOMPSON
BY
Charles McClair
ATTORNEY

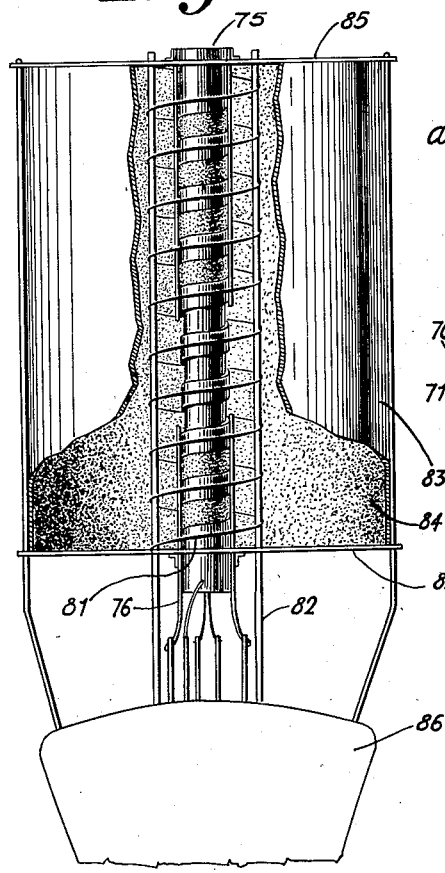
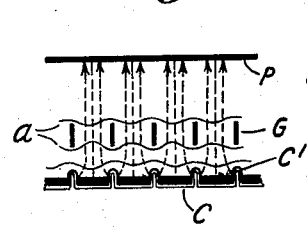
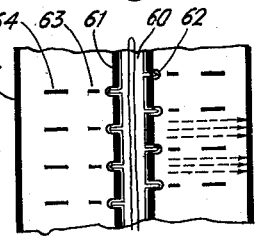
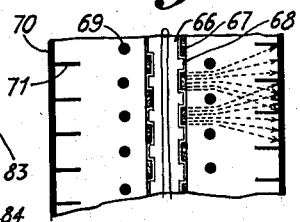
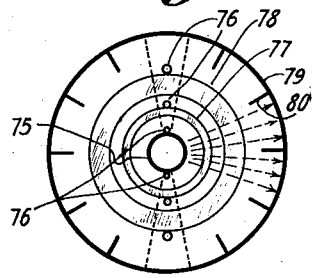
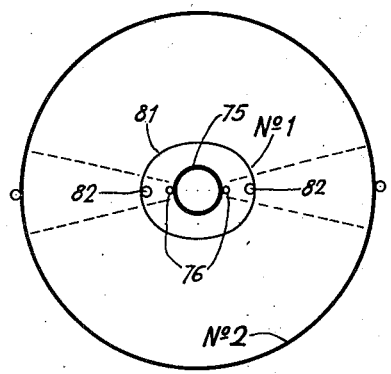
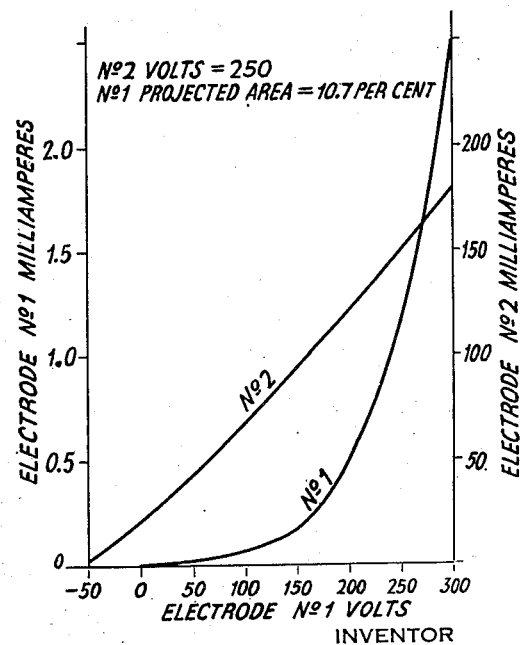

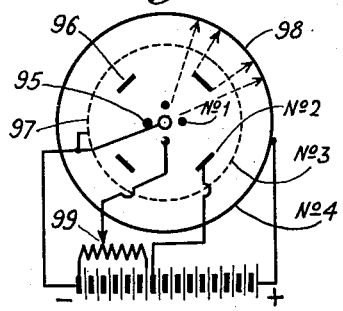
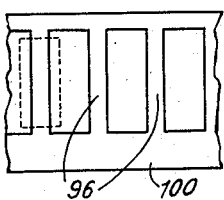
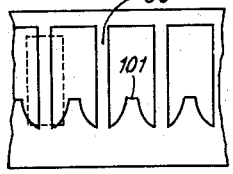
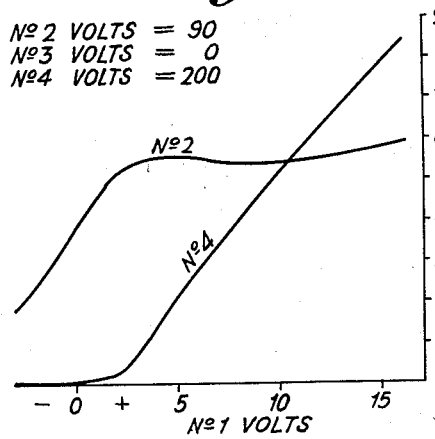
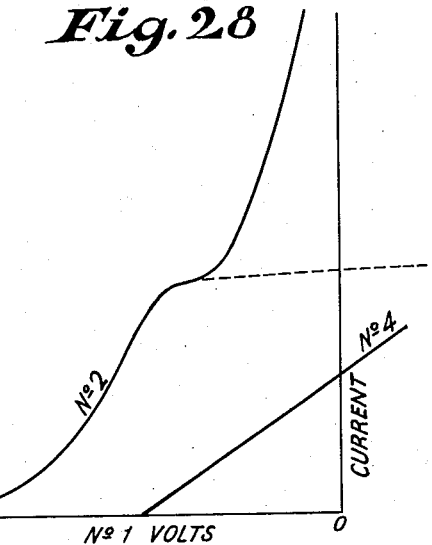
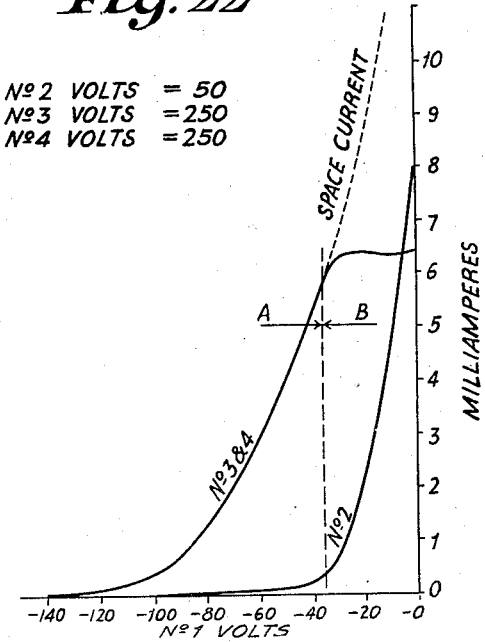
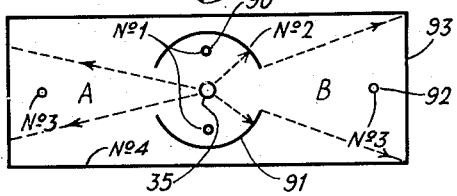
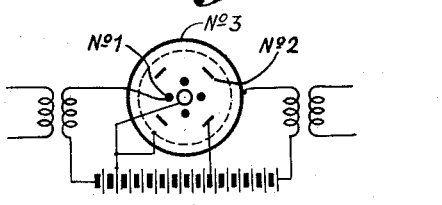

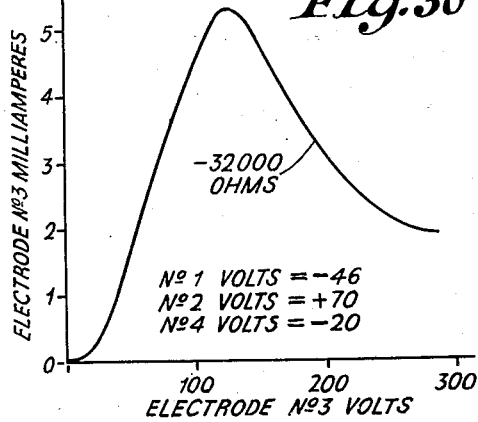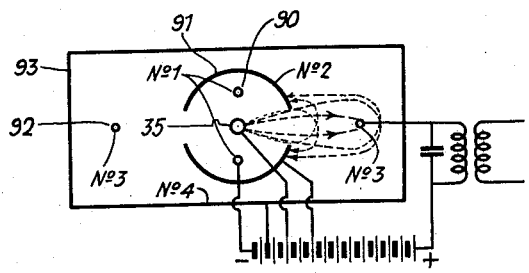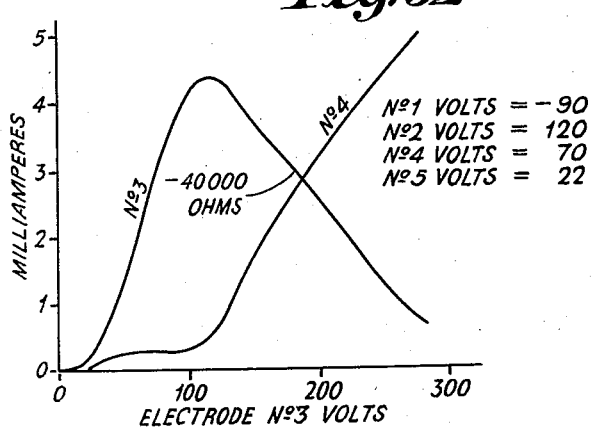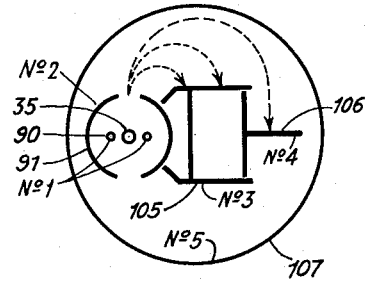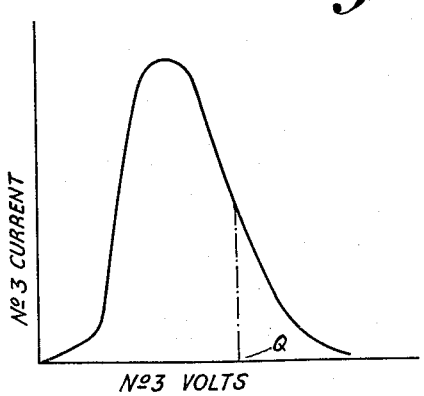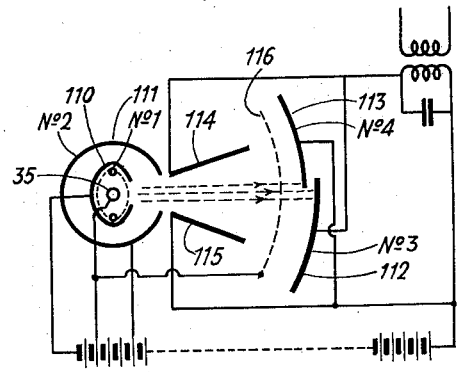

Patented Aug. 26, 1941

2,254,095

UNITED STATES PATENT OFFICE 2,254,095

ELECTRON BEAM DISCHARGE DEVICE

Harry C. Thompson, Ludlow, Vt., assignor, by mesne assignments, to Radio Corporation of America, New York, N. Y., a corporation of Delaware Application July 5, 1935, Serial No. 29,808
Renewed February 9, 1940

17 Claims. (Cl. 250—151)

My invention relates to electron devices having thermionic cathodes and cooperating cold electrodes, and more particularly to devices of this type which utilize an electron discharge concentrated into more or less well defined beams of electrons and which will operate at the comparatively low voltages generally used in the conventional receiving tubes.

The electron discharge or space current from the cathode through the grid to the anode in the conventional types of electron tubes, such as are used as receiving tubes, is usually assumed to be uniformly distributed in the space between the cathode and anode, and to be affected in volume and not in distribution in space by variations in grid potential. It has been found by experimental work and observation that this assumption is not strictly correct and that the space current from a thermionic cathode, either directly or indirectly heated, is segregated into beams or rays by charged conductors adjacent the cathode and spaced from one another, and that the size and shape of the beams are dependent on the position of the conductors with reference to the cathode and to one another, and on the potential of the conductors with reference to the cathode and to a cooperating positive electrode, such as the anode. The openings of thin structures, such as grids, placed in the electron stream act even under space charge limited conditions like converging or diverging electron lenses according to whether the structures are below or above their space potential. At space potential of the structures approximately geometrical electron shadows of the structures are cast on the plate. In the conventional tubes no advantage is taken of this segregation of the electron stream into beams, and the conventional tubes operate substantially in agreement with theories which assume substantially uniform distribution in space of the space current.

Electron beams, usually small, and circular cross section, have been utilized principally in tubes of the X-ray and cathode ray oscillograph types which operate at comparatively high voltages, in some cases several thousand volts, and in which usually only a small part of the total emission from the cathode is concentrated into a beam. Electron discharge tubes have been proposed for use as relays, detectors, and similar purposes in which a similar electron beam is deflected in much the same way as in a cathode ray oscillograph, but such tubes have low efficiency and poor transconductance as compared with conventional types of tubes, hence such discharge tubes of the cathode ray type have been limited commercially to rather special fields of use and are of no practical value at low voltages.

One object of my invention is to provide electron discharge devices of the beam type which are efficient and utilize substantially all of the emission from a thermionic cathode and in which the total discharge from the cathode is formed into a plurality of more or less well defined beams which are utilized in novel and effective ways to obtain improved tubes having advantages unobtainable with the conventional types of tube structure.

Another object of my invention is to provide improved electron discharge devices which are of much the same dimensions and are operated at much the same voltages as the conventional receiving tubes and in which various desirable characteristics are obtained by segregating the space current into an electron beam or beams and utilizing the properties of the beam to advantage.

A still further object is to provide an electron discharge device of the electron beam type which is of greater efficiency and operates at lower voltages than the beam type devices heretofore used.

Still another object of my invention is to provide electron discharge devices having desirable transconductance and impedance characteristics which are not obtainable with the conventional type of tube structure.

A further object is to provide an electron discharge device having a control grid or similar electrode which may be operated over a positive range of potential with reference to the cathode and receive a current so radically reduced from that commonly obtained that the positive grid is substantially currentless during operation of the tube.

Another object is to provide an improved negative resistance electron discharge device in which the negative transconductance or negative resistance is substantially constant, is independent in magnitude of the external circuit constants, and is not dependent upon secondary emission or space charge effects.

Still another object is to provide improved means for rendering the distribution of the electron stream in space non-uniform and for forming the electron stream into electron beams.

In accordance with my invention the space current from a thermionic cathode which supplies space current, preferably limited by electrode potentials and not by temperature of the cathode, is formed into one or a plurality of electron beams normal to the cathode surface, the relation of the beam or beams to cold electrodes in the tube being varied in different ways to obtain the desired characteristics. Tubes with grids which take practically no current from the electron stream can be made by segregating the space current into electron beams slightly narrower than the openings in a control or other grid and directing these beams through the control grid openings, whereby the total electron flow may be influenced by the grid, with comparatively small loss of current to the grid even when it is positive. Various desirable characteristics may be obtained by directing the beam or beams to suitably positioned or shaped positive electrodes, which may in some cases be rods or slats and in other cases sheet metal electrodes having slots or apertures. By maintaining the beam cross section constant and controlling the amount of current in the beam, or by varying the beam cross section in a particular way, as by focusing and defocusing the beam on a rod electrode or in an opening in a positive electrode to obtain an electron beam of a cross section which bears certain relations to the area of the rod or to the opening, desirable variations in the amount of current collected from the beam can be obtained. The beam may also be deflected from its median plane with reference to a collector electrode so positioned that desirable variations in the current are obtained in response to controlled deflection of the beam. The transconductance of the tubes can be made high by means of improved beam forming structures so constructed that the space current from a given area of cathode when segregated into beams is practically as great as is obtained from the same cathode area in conventional tubes.

One convenient way to study the distribution in space of the space current is to coat an appropriate electrode, such as an anode or positive collector electrode, with a layer of luminescent material, such as willemite in fine particles. Such a layer bombarded by electrons becomes luminous where and only where electrons of sufficient energy and quantity impinge on it. If the space current is divided into beams, there appears on a bombarded electrode a luminous pattern corresponding to the cross section of the beams at the surface of the electrode. Another way is to introduce some gas at low pressure and the consequent glow makes visible the path of the beam throughout most of its length, and I have found that the gas makes no appreciable alteration in the path of the beam.

The novel characteristics of my invention are pointed out with greater particularity in the appended claims, but the invention itself will best be understood from the following specification taken in connection with the accompanying drawings in which:

Figures 1 to 4 are diagrams illustrating some principles;

Figure 5 is a diagrammatic cross section and Figure 6 curves illustrating some current characteristics of one form of tube utilizing electron beams;

Figures 7 and 8 are diagrammatic and longitudinal cross sections of another form of beam tube;

Figure 9 is a diagrammatic cross section, and Figure 10 current curves of a device having relatively good transconductance.

Figure 11 is a diagrammatic cross section of a low capacity high transconductance amplifying tube having a beam forming structure of the kind shown in Figure 9.

Figures 12 and 13 are views of improved types of beam forming structures;

Figure 14 is a diagram illustrating some principles of beam formation in a plane parallel three electrode structure having a cathode with non-emitting portions;

Figure 15 is a diagrammatic longitudinal section of a cylindrical screen grid tube utilizing a beam forming cathode with non-emitting portions;

Figure 16 is a diagrammatic longitudinal section of a cylindrical type of tube embodying some of the principles illustrated in Figure 14, and particularly suitable for use with high positive grid potentials;

Figure 17 is a diagrammatic cross section of a screen grid tube with grids such as shown in Figure 15 and a cathode such as shown in Figure 16;

Figure 18 is a view in perspective of a three electrode assembly with the cathode broken away near the middle and a portion of the anode broken away to show the interior; Figure 19 a cross section, and Figure 20 current curves of a tube which has a beam forming cathode with a non-emitting strip helically disposed on its surface and a helical grid in registry with the non-emitting strip;

Figure 21 is a diagrammatic cross section of a two beam structure; and Figure 22 some current curves of this device;

Figure 23 is a diagrammatic cross section of a four beam structure similar in principle to the structure of Figure 21; and Figure 24 some current curves of this tube over a positive voltage range on the No. 1 electrode;

Figure 25 is a circuit diagram of the tube of Figure 23 connected to be operated over a negative voltage range on the No. 1 electrode;

Figure 26 is a developed view of the No. 2 electrode of the tube shown in Figure 22;

Figure 27 is a developed view of a modified No. 2 electrode, and Figure 28 some current curves obtainable from the tube with this modified electrode;

Figure 29 is a diagrammatic cross section, and Figure 30 a work electrode current curve of a tube constructed as shown in Figure 21 and operated as a negative resistance device;

Figure 31 is a diagrammatic cross section, and Figure 32 some current curves of a negative resistance device utilizing acceleration of orbital beams;

Figure 33 is a diagrammatic cross section, and Figure 34 a work electrode current curve of a negative resistance device utilizing deflection of a straight beam.

Some of the basic observations and principles relating to electron discharge devices constructed in accordance with my invention are illustrated in Figures 1 to 4 of the accompanying drawings which show diagrammatically a plane parallel three electrode system with a plane cathode $c$, either temperature limited or space charge limited, a plane anode or plate $p$ coated with willemite and mounted parallel to and spaced 0.40 inch from the cathode, and a plane grid $g$ spaced 0.125 inch from the cathode and consisting of straight wires 0.005 per inch in diameter spaced 0.10 inch apart to be parallel to the cathode and to each other. In these diagrams the electron paths are indicated by arrows, the equipotential lines of force between the cathode and anode are indicated by (a) and the beam traces on the anode by the lines (b), the intensity of these traces being indicated by the thickness of the lines. When, as indicated in Figure 1, the plate is at fixed potential, such as 250 volts, and the grid is sufficiently positive to be at its space potential, the electrostatic field at the grid is undistorted, the equipotential lines of force are parallel to the cathode and to the anode, and the space current through the grid forms parallel beams which produce on the plate straight parallel beam traces or streaks of light in alignment with and of substantially the full width of the openings between the grid wires and separated by narrow black bands in alignment with the grid wires. The pattern on the plate is practically a shadow of the grid. When the grid is at a potential other than space potential, the electrostatic field at the grid is deformed and this deformation affects the distribution in space of the space current so that the rectangular grid openings act on the electron stream much like cylindrical lenses act on light, and segregate the electron stream into several beams rectangular in cross section and of much greater width than thickness. When, as shown in Figure 2, the grid is made sufficiently positive to be considerably above its space potential, the lines of force near the grid curve around the grid wires toward the cathode, and the whole anode surface becomes luminous, with brighter streaks or intense major traces in alignment with the grid wires, showing that the space current through the openings in the grid is formed into diverging beams which at the anode are wider than the grid openings and overlap at the edges, thus producing brighter or major intense traces in alignment with the grid wires. When, as shown in Figure 3, the grid potential is reduced below its space potential, the equipotential lines of force are curved around the grid wires and away from the cathode, the black bands become wider, and the beam traces on the anode become narrower, although still in alignment with the centers of the grid openings, indicating that under these conditions the space current through the grid is concentrated into convergent beams directed to the anode. In some cases the width of these beam traces is only one-fifth to one-tenth of the spaces between the grid wires, indicating that the beams are practically focused on the plate. When, as shown in Figure 4, the grid goes to still lower positive, to zero, or even to slightly negative potential, the luminescent lines or beam traces on the anode become wider.

The distribution of the space current in space depends not only on the potential of the beam forming grid, but also on the spacing of the grid wires and on the potential and position of the cooperating positive electrode, such as the plate. In the structure diagrammatically represented in Figures 1 to 4, I have observed that to give minimum beam width or focus on the plate there is required with more closely spaced grid wires a more positive grid potential; with increased spacing between the grid wires a less positive potential; and with still greater spacing of the grid wires, a grid potential which is zero or even negative with respect to the cathode. In any case, when the grid is at zero potential, the beam width at the plate is independent of the plate potential. This fact is important in connection with structures in which the beam forming grid or electrode is maintained at cathode potential, as, for example, where it is an integral part of the cathode structure, as in such a case the width of the beam at a positive electrode, such as a plate, is constant for all values of potential of that positive electrode. When the beam forming grid or electrode is at a bias or potential other than zero, the plate potential affects the beam width in ways which will be described in connection with some of the specific embodiments of my invention.

In general, any perforated electrode in the position of the grid will form beams which behave as above described, and the observations and explanations above set forth for a plane parallel structure apply in general to three electrode cylindrical structures, such as tubes having a tubular grid with helical or annular turns coaxial with and surrounding a cylindrical equipotential cathode and in turn surrounded by a coaxial cylindrical anode or plate, although if the spaced grid elements are parallel to the cathode, the observations as to beam width and convergence must be somewhat modified. The electron lens effect of the electrostatic field deformation near the openings of the perforated electrode in a cylindrical structure when that electrode is below its space potential is much the same as in a plane parallel structure.

In accordance with my invention I may provide electron discharge devices employing beam forming structures for segregating space current into one or more beams and having control electrodes which control the magnitude of the space current and operate over a potential range which includes a positive potential, the control electrodes or grids having their elements so placed with reference to the electron beams as to avoid receiving electrons from the cathode. I have found experimentally that in a variety of widely different structures it is possible by systematic employment of electron beams to make the ratio of the percentage of space current received by a positive electrode situated between the cathode and the ultimate anode to the percentage projected area of that positive electrode very much smaller than in the usual construction, where there is no systematic segregation of space current into beams and no displacement of the control electrode elements out of the paths of the beams. By suitably positioning the elements of the grids with reference to the beams, it is feasible to provide tubes in which grids positive with reference to the cathode are substantially currentless.

Figure 5 shows diagrammatically in cross section the electrode assembly of a tube in which, in accordance with my invention, the space current between electrodes enclosed in the usual evacuated envelope is segregated into beams which flow through the openings in a grid electrode to a plate or anode. The space current originating at a straight cylindrical indirectly heated equipotential cathode, which in this and the other figures showing analagous structures is marked 35, is formed into a plurality of radial sheet beams rectangular in cross section by a perforated beam forming No. 1 grid electrode 36 including a plurality of spaced beam forming conductors or wires parallel to the cathode and to one another and arranged in a cylindrical surface surrounding and coaxial with the cathode. A similarly constructed No. 2 grid electrode 37 surrounds and is coaxial with the No. 1 grid and has corresponding conductors or wires in registry with the wires of the No. 1 grid. A No. 3 electrode, such as an imperforate tubular plate 38, surrounds and is coaxial with the grids. The electrodes are connected as shown to an input circuit 39, to an output circuit 40, and to the usual battery or other source of voltage.

In accordance with the principles discussed in connection with Figures 1 to 4, the space current is segregated by the No. 1 grid into eight sheet beams which extend radially from the cathode and are of rectangular cross section with a large ratio of cross sectional length to width. Two of these beams are indicated in Figure 5. Such beams are much superior to circular section beams in low voltage beam devices, because a beam of such rectangular cross section carries much more space current at low electrode potential than a beam of circular cross section of a diameter equal to the cross section width of the rectangular beam and is as easily deflected or controlled by a conductor beside it as a cylindrical beam.

The electrostatic field deformation near the openings in the grid in the diagrams Figures 1 to 4 has a cylindrical lens effect like the deformation at the openings in the grid in those figures, and segregates the space current beyond the No. 1 grid into fairly well defined radial beams narrower than the openings in the No. 2 grid and containing most of the space current. The wires 37 of the No. 2 grid are in the regions between the beams and in registry with the No. 1 grid wires 36, and will collect only a small amount of space current even when strongly positive, hence the grid current is reduced radically from what it would be were the space current not segregated into beams. For example, in a structure such as indicated in Figure 5 in which a cathode 0.05 inch in diameter is surrounded by a No. 1 grid composed of 8 wires each 0.015 inch in diameter and set in a circle 0.12 inch in diameter, the No. 2 grid may be of wires of the same number and diameter as those of the No. 1 grid, in which case the projected area of the No. 2 grid is about 10%, yet the current to the No. 2 grid is only about 0.2% of the plate current. With such a cathode long enough to give about 4 to 6 milliamperes space current and with the No. 1 and No. 2 grids at suitable positive potentials, the space current is confined to 8 beams, each about 0.01 inch wide at the plate. If the No. 1 grid is biased at 3 volts negative, the current to the No. 2 grid when it is 150 volts positive is only about 0.3% of the space current and even when at plate potential of 250 volts the current is only between 4% and 5% of the space current. Even when the No. 2 grid is of wires as large as 0.04 inch so that it has a projected area of 26%, the No. 2 grid current at 150 volts positive is only about 0.7% and at 250 volts only about 15% of the space current, even though in this tube no precautions were taken to suppress secondary emission from the plate.

The tube may be operated as a screen grid tube with negligible current to the screen grid by impressing a modulating potential on the No. 1 grid which is biased somewhat negative. The No. 1 grid then acts as a beam forming electrode and also as a modulating electrode, while the positive No. 2 grid becomes a currentless screen grid.

Figures 7 and 8 show diagrammatically a modification in which, as in Figure 5, the cathode 35 is surrounded by a No. 1 electrode or grid 41 close to the cathode and composed of a helix of fine wire or of equidistant coaxial rings of either wire or sheet metal. The No. 2 electrode 42 is in the form of a grid similar to the No. 1 electrode and is of either wire or sheet metal rings or it may be a helix of edgewise-wound flat metal strip or ribbon. In any case its turns are in registry with the turns of the No. 1 grid. The No. 3 electrode or plate 43 is a tubular electrode or sheet metal coaxial with and surrounding the No. 2 electrode. The beams produced by the structure of Figures 6 and 7 are circular sheet beams in planes at right angles to the cathode axis and pass between the turns of the No. 2 grid, instead of being in the same plane as the cathode in Figure 5. In this cylindrical structure the electron flow follows substantially the same laws as in the plane parallel structure of Figures 1 to 4, with the exception of differences in magnitude, and the structure has advantages due to concentration of field about the axial cathode.

Figure 9 shows a device in which the beam forming elements are both longitudinal and transverse of the cathode, and with which a fairly high transconductance can be obtained. This beam forming structure surrounding the cathode 35 comprises a No. 1 electrode, such as an elliptical helical grid 45 which carries attached to side rods a tubular sheet metal cylinder 46 having two slots positioned 90° from the plane of the side rods with their edges extending beyond the cylindrical surface of the helical grid 45, and a cylindrical No. 2 or acceleration electrode 47 coaxial with and surrounding the No. 1 electrode. This beam forming structure segregates practically the entire discharge from the cathode into two rather narrow rectangular beams extending in diametrically opposite directions from the cathode. A No. 3 electrode, such as a slotted cylinder 48 with slots in registry with the slots in cylinder 47 surrounds the beam forming structure and is in turn surrounded by an imperforate tubular No. 4 electrode or anode 49. Tests of a device of this kind, with No. 3 and No. 4 electrodes connected, and in which the No. 2 electrode 47 had a projected area of 74% and was strongly positive, gave volt ampere curves such as shown in Figure 10. The current to the No. 2 electrode 47 was very low, and the transconductance of the device compared favorably with that of the conventional type of tube.

Figure 11 shows my invention embodied in a low capacity high transconductance beam type of tube in which beams are produced by a beam forming structure such as indicated in Figure 9, and in which directional restriction of space current as well as control of its magnitude may be obtained. This beam forming structure is coaxial with a tubular No. 3 or screen electrode 50 having two slots or passages in alignment with the slots of the beam forming structure. When this No. 3 electrode with its two diametrically oppsite openings parallel to the cathode and in a plane normal to the plane of the side rods of the No. 1 grid is at zero potential, it acts both as a secondary emission suppressor electrode and also as a re-focusing electrode for the beams emerging from the slots of the beam forming structure. The anode comprises two metal plates 51, one in the path of each beam, and only slightly wider than the cross section of the beam which impinges on it, hence the anode capacity may be radically reduced from that of the conventional tube and the focusing of the beams on these plates can be so good that electron leakage around them is negligible and thereby secondary emission from the bulb may be avoided. Also these plates, which are connected together to form the No. 4 electrode or anode, may, to advantage, be made as narrow troughs so positioned that practically all of the beams impinge upon the bottoms only of the troughs, thereby reducing secondary emission from the anode. In a tube of approximately this construction, with the control or No. 1 grid biased about 2 volts negative, I have obtained a transconductance about 1400 at 5 milliamperes space current and have observed that under these conditions the No. 2 or screen electrode takes only about 0.1 milliampere even when it is nearly as positive as the anode.

In the above described devices the beam forming and space current controlling functions are performed simultaneously by a single electrode. In many cases it is desirable to separate these two functions and cause them to be performed by different electrodes which may be at different average potentials and may have periodic voltage variations impressed on them of different magnitudes and of different frequencies. In some such cases the cooperating separate electrodes may have their elements and openings in registry, but in others it is preferable to have the elements and rectangular openings of such electrodes in transverse relation to each other or in anti-registry.

Figure 12 shows one form of such a structure in which the cathode 35 is surrounded by a helical grid 55 which modulates or controls the space current, and in turn is surrounded by a second coaxial grid of longitudinal elements 56 connected and supported by rings 57. This second grid will form the modulated space current into a longitudinal system of beams, and its elements and openings should be in registry with any desired system of electrodes still more remote from the cathode and constructed to utilize the longitudinal system of beams in accordance with my invention and to disregard any transverse subdivision of such longitudinal beam system by the helical or ring elements of the control grid 55. I have observed that modulation by such an electrode 55 has slight effect upon the width of the longitudinal beams in such a device.

Figure 13 shows a converse arrangement, in which the inner or space current controlling electrode 58 is a grid constructed, like the second grid in Figure 12, of longitudinal elements, and the coaxial outer or beam forming electrode 59 is a helical winding or rings surrounding the inner grid. The outer electrode 59 sets up a system of sheet beams rectangular in section with their longer dimensions transverse to the cathode axis, and the more remote electrodes have their openings similarly shaped and suitably registered to utilize such a system of beams without regard to the subdivision of such transverse sheet system into longitudinal segments by the inner electrode 58.

In structures such as shown in Figures 1 and 5 I have observed that in some cases when the grid adjacent the cathode is at zero or negative potential there may appear on the anode a system of faint or minor beam traces beside and in addition to the major or intense beam trace system. Making the grid slightly positive causes this minor trace system to disappear. Probably the minor beam trace arises from a virtual electron source formed under each grid element and between it and the cathode, and these small virtual sources furnish the extra beam pattern represented by the minor beam trace system. It is desirable to eliminate these minor beam systems where the beam forming properties of grids are utilized for the production of currentless positive electrodes and particularly where such electrodes must have high impedance and low electron currents. For eliminating these minor beam systems originating from virtual cathode sources, the beam forming electrode may be combined with the cathode in such a way that the beam forming grid is very close to and in effect rests on the cathode, so that no virtual electron sources under the grid elements can exist, or the parts of the cathode structure under the elements of the control grid may be made non-emitting. In this way suppression of the minor beams and increased transconductance of the control electrode may be obtained, as the control electrode can be placed nearer the cathode and the shielding of the cathode from the control grid by the beam forming electrode is reduced to a minimum.

Figure 14 is a diagram illustrating some of the principles in connection with the use of such a cathode. In this diagram the plane cathode C has ridges or elevations C' between which the cathode surface is coated with electron emitting oxides, such as barium or strontium oxides. The edges of the ridges project above the electron emitting coating and are uncoated and therefore non-emitting and have the effect of and constitute a virtual beam forming grid close to the cathode and at zero potential. A positive grid electrode G adjacent this cathode with its elements in registry with the ridges or non-emitting portions of the cathode will deform the field approximately as indicated by the equipotential lines of force in the diagram, and the space current from the cathode to a plate P will be formed into beams, as indicated by the arrows. The positive grid electrode has an effect as regards beam formation by another grid near the cathode nearly the same as that of the plate anode P of Figures 1 to 4. The field near the openings of such a grid is of the character shown in Figure 14 and has a tendency to diverge the beams. It is important that such diverging tendencies near a positive electrode are less effective upon the beam than the converging tendencies of the lower voltage field near the beam forming elements, as the electrons in the field near the beam forming grid are moving slowly and are influenced by its converging tendency for a longer time than they are by the field of the positive grid after having been accelerated. The beam forming properties of a cathode having alternate emitting and non-emitting portions may therefore be utilized to cause the electron streams from the emitting portions to avoid a positive grid electrode, such as a control electrode or screening electrode.

Tubes which are capable of operating with a grid at positive potential and with negligible current to the grid have desirable properties and overcome some serious disadvantages of the conventional types of tubes. For example, in the so-called class B and class C modes of amplifier operation the control grid potential is in a positive range during part of the oscillation cycle and in hitherto existing devices certain troubles and limitations have arisen from this fact. In the positive range of operation control grids of the conventional kind, particularly in power devices, receive a considerable percentage of the space current and such operation requires a relatively large and entirely wasteful input of modulation power, an undesired heating of the control grid, distortion of the amplifier output and an array of subsidiary troubles. In amplifiers employing oxide cathodes these subsidiary troubles include excessive thermionic and secondary emission from such grids because of the deposition thereon of material from such cathodes. These troubles arise directly and indirectly from the bombardment of the grid by electrons and all are consequently very much mitigated by the radical reduction of such bombardment by the means here disclosed.

Figure 15 shows a screen grid type of tube constructed in accordance with the principles illustrated in Figure 14, and having substantially currentless grids. The cylindrical cathode 60 has its surface coated with electron emitting material 61 between the turns of a non-emitting helical ridge 62. An edgewise wound helical ribbon No. 1 electrode or control grid 63 of the same pitch as the cathode ridge and a similar No. 2 electrode or screen grid 64 are mounted coaxial with the cathode with the turns of both grids in registry with each other and with the cathode ridge. A No. 3 electrode or anode 65 surrounds and is coaxial with the grids. The No. 2 or screen electrode is interposed between No. 1 and No. 3 in such a way as to electrostatically screen No. 1 from No. 3, but with its openings in registry with the openings of No. 1 and the emitting areas on the cathode, so as to minimize the current to itself. In this figure I have illustrated the grids as made of edgewise wound metal ribbon or strips, although grids made of wire can be used if desired. The edgewise wound grids may in some cases be advantageous in giving somewhat higher transconductance. It is usually desirable to minimize the secondary electron emission from the anode as much as possible as, for example, by coating the inner surface of the anode with lamp black or with other finely divided conductors such as electrolytically deposited nickel.

Figure 16 shows a triode utilizing a similar type of cylindrical cathode 66 with the electron emitting material 67 on its surface deposed in a helical groove formed in the cathode to leave a non-emitting helical strip 68 between the turns of the groove. The groove is filled to the surface of the cathode, so that the emitting and non-emitting portions of the cathode are in the same cylindrical surface. A helical grid 69 is mounted coaxial with the cathode and with its turns in registry with the non-emitting helical strip on the surface of the cathode. A tubular anode 70 surrounds the grid, and may to advantage be provided on its inner surface with pockets or recesses in definite relation to the grid. For example, the anode may have pockets between a plurality of inwardly extending vanes or ribs 71 on the anode. The proper relation of these ribs and the pockets between them to the other elements of the tube is dependent upon conditions under which the tube is used. The beams should be directed so far as feasible to impinge upon the anode in the pockets between the inwardly extending ribs. Where the positive potential of the grid 69 in operation is usually no greater than the potential of the anode, the ribs 71 should be in alignment with the grid turns and with the non-emitting portion of the cathode. Where the grid during operation usually attains positive potentials higher than the anode potential, the ribs 71 should be, as shown in Figure 16, in alignment with the spaces between the grid turns, since the conditions are similar to those illustrated in the diagram Figure 2, and the major concentration of the beams and the major beam trace on the anode will be in the pockets and in alignment with the grid wires.

Figure 17 is a diagrammatic cross section of a screen grid tube much like Figure 15. The cathode 75 is of the same construction as the cathode 65 in Figure 16, but has in addition two longitudinal non-emitting strips formed by two uncoated wires or rods 76 lying alongside the cathode and at zero potential. The side rods 76 of the grids 77 and 78, which are like the grids 63 and 64 of Figure 15, are in alignment with and in the electron shadows of the cathode rods 76, as indicated by broken lines. Secondary electron emission from the tubular anode 79 is reduced by any suitable means, such as inwardly projecting longitudinal ribs on its inner surface. The cathode rods 76 may be replaced by non-emitting uncoated strips or regions which are uncoated or rendered non-emitting in any suitable way. By this construction, in which all of the corresponding parts of the grids are in registry, the electron flow in the plane of the grid rods is negligible, and practically all of the space current flows through the openings of the grids.

Figure 18 is a perspective view with a part of the anode and some parts of the cathode broken away, of the electrode assembly of one three electrode tube which I have made embodying my invention; and Figure 19 is a cross section of this tube. In this particular tube the cathode 75 has a cathode sleeve like that of Figure 16 with a helical groove or recess filled with the electron emitting coating, the surface between the turns of the groove being left uncoated, and therefore non-emitting. The non-emitting and emitting areas are about equal in extent, and constitute a common cylindrical cathode surface. The grid 81 is 0.005 inch molybdenum wire wound into a helix of ten turns per inch and supported by two grid side rods 82 of 0.20 inch nickel wire. The grid is coaxial with and surrounds the cathode, with the turns of the grid in registry with the non-emitting portion of the cathode, which is helical and of the same pitch as the grid. This particular grid is elliptical, with a major diameter of 0.22 inch and a minor diameter of 0.19 inch, and is carbonized or blackened to reduce back emission. The parts of the cathode in alignment with the grid side rods are rendered non-emitting in any suitable way, preferably by the longitudinal cathode rods 76 of 0.015 inch nickel wire extending lengthwise of and electrically connected with the cathode sleeve, and in registry with the support rods 82 of the grid. One convenient way of positioning these cathode rods is, as shown in Figure 18, to secure them to supports in the press and in direct contact with the uncoated non-emitting portion of the cathode. The tubular anode 83 coaxial with and surrounding the grid is about 1 inch long and 0.75 inch inner diameter, and has on its inner surface a coating 84 of lamp black to substantially eliminate secondary electron emission. The helical groove in the cathode is filled with a thin wet spray of the usual electron emitting oxides, such as barium oxide and strontium oxide, so as to be substantially flush with the remainder of the cathode. The electrodes may be held in proper relation to one another in various ways, preferably by mica spacers 85 at the ends of the electrode assembly, which is carried on the usual press 86 of the bulb (not shown).

Figure 20 shows some volt ampere characteristics obtained at an anode voltage of 250 volts from the tube shown in Figure 18, in which the projected area of the grid is about 11%. The current to No. 2 electrode or anode 83 is shown as a function of the No. 1 electrode or grid 81 voltage, which includes a positive range up to 300 volts, that is, 50 volts higher than the steady potential of the No. 2 electrode. At this highest positive potential of the grid the current to it is a maximum, and is equal to about 2 milliamperes, whereas No. 2 current is equal to about 200 milliamperes. The maximum space current flowing to the No. 1 electrode or control grid is not more than about 1.5% of the space current to the anode even when the grid is at a considerably higher potential than the anode. As is well known, the loss of electrons from a grid is negligible when the grid is at higher positive potential than the anode, hence the observed low percentage of current to the grid is not due to secondary emission from the grid, but is due entirely to its position out of the paths of the beams.

The currentless grid tube with a cathode having emitting portions separated by non-emitting portions disclosed in Figs. 14 to 20 is claimed in a continuation in part application Serial No. 347,649, filed July 26, 1940, and entitled "Currentless grid tubes."

The transconductance characteristics of a beam type tube may, in accordance with my invention, be shaped as desired within wide limits, and characteristics thus obtained which are unobtainable in the conventional type of tube. In these devices the beams representing the space current may have their cross section and the magnitude of the space current simultaneously controlled by the potential of the input electrode. By virtue of this change of cross section of the beam, collector or rejector electrodes of suitable shapes may be placed in such positions that they intercept different portions of the beams at any desired voltage of the input electrode, and in this way the transconductance may be transferred in whole or in part from one electrode to another, and, if desired, a more or less complete saturation type characteristic of current to one of the electrodes may be obtained. In addition, by special shaping of the electrodes to which the current flows, various other changes in characteristics are feasible.

Figure 21 shows a device utilizing a change in cross section such as a variation in beam width to obtain certain characteristics. This device comprises a cylindrical cathode 35, a No. 1 electrode consisting of two parallel wires 90 adjacent and extending longitudinally of the cathode and a No. 2 electrode consisting of a cylinder 91 of sheet metal with two openings or slots positioned 90° from the plane of the two wires 90 of No. 1 electrode. In this particular device the No. 3 electrode is a pair of wires 92 parallel to the cathode and in the plane of the center lines of the slots in the No. 2 electrode and the No. 4 electrode is a sheet metal box 93 surrounding the other electrodes. This particular structure can be used in various ways, as the wires 92 may be operated as one electrode or as two independent electrodes, and either connected to or independent of the box electrode 93, depending on the results desired. To illustrate the beam action, the No. 3 and No. 4 electrodes were connected to form a positive beam collector. With these connections, and the electrodes at the voltages indicated in Figure 22, I have found that there is a bias potential for the No. 1 electrode at which the beam width at No. 2 becomes equal to the opening in No. 2, and which, for convenience, I call the critical bias voltage. In this particular case this critical voltage was about 40 volts negative. With negative biases on electrode No. 1 greater than the control voltage the beam width is less at No. 2 electrode than the openings in No. 2 electrode and the latter, therefore, receives practically no current, as appears from the No. 2 current curve in Figure 22. As the negative bias on No. 1 is decreased to the critical voltage, the beam width becomes equal to the width of the opening in No. 2, at which point, and not before, the No. 2 electrode begins to receive a portion of the beam current. With any further decrease in bias voltage the resulting increment of space current occurs entirely on No. 2, so that at any bias less than this critical value the whole increment current takes place on No. 2, while the current to Nos. 3 and 4 remains substantially constant in value. This change at the critical voltage may be expressed as a transference of the transconductance of No. 1 with respect to No. 2. The critical voltage of No. 1 at which this transference of transconductance takes place is a function of the width of the beam for a particular bias on No. 1 in relation to the width of the opening in No. 2. By varying either the dimensions of the wires 90 in No. 1 and their spacing from the cathode, or both, and by varying the width of the opening in No. 2, this transference of transconductance can be made to occur at any desired negative bias of No. 1, or at any positive bias, if it be preferred in a particular case.

Figure 22 exemplifies this transference of transconductance in the device shown in Figure 21, and the range A of Figure 22 corresponds to the range of negative potentials of No. 1 which exceed the critical value, while range B corresponds to those negative potentials on No. 1 less than the critical value. The dotted line labelled "Space current" in Figure 22 represents the sum of the currents to both electrodes No. 2 and Nos. 3 and 4 as a function of No. 1 voltage. In Figure 22 the flat portion of the Nos. 3 and 4 characteristic between 6 and 7 milliamperes resembles a saturation characteristic, although the space current is by no means saturated. This figure shows that the current characteristic of No. 2 has a much more abrupt rise from very low values than that of Nos. 3 and 4 at corresponding low values of current. This means that if No. 2 be regarded as an anode or work electrode, its transconductance curve has been made to approach the zero axis more abruptly than would have been the case in a conventional triode structure. In effect the part of the space current to No. 1 voltage characteristic which is represented by current to Nos. 3 and 4 has been rejected so far as the characteristic of No. 2 is concerned until its slope becomes sufficiently great to have the desired value, whereupon that value is realized at the No. 2 current to No. 1 voltage characteristic.

Figure 23 shows a device in general similar in principle to that shown in Figure 21, but with a reversal of the functions of the No. 2 and No. 4 electrodes. In Figure 23 the cathode has parallel to it a No. 1 electrode of four equally spaced beam forming elements 95, and the No. 2 electrode consists of four slats 96 placed in registry with the openings of the No. 1 electrodes. These elements 96 obstruct the beams at large negative biases of the No. 1 electrode, while in Figure 21 the elements 91 are in registry with the elements 90 and hence offer no obstruction to the beams at similar biases, but only at positive biases. The No. 3 electrode is a helical grid 97 connected to the cathode to act as a suppresser grid, and the No. 4 electrode is a tubular anode 98, which surrounds the other electrodes. This reversal function of the electrodes near to and remote from the cathode make it possible to give to the more remote electrode whichever of the two types of characteristic is desired and thus make such remote and hence high impedance electrode the output electrode in all cases. In this modification shown in Figure 23 the widths of the beams at No. 2 are less than those of the slats comprising No. 2 for all potentials of No. 1 negative with respect to its critical potential and for such potentials the beams are completely obstructed by No. 2 and the current to No. 4 is zero. At voltages of No. 1 positive with respect to its critical potential the width of the beam is greater than that of the obstructing elements of the No. 2 electrode and consequently the increase in space current above that corresponding to critical potential of No. 1 goes to the No. 4 electrode.

In general the current characteristics of this modification are much the same as those of the device shown in Figure 21, as appears from the current curves shown in Figure 24. In the device of Figure 23 the saturation type of characteristic occurs on the inner electrode No. 2, whereas in the device of Figure 21 it occurred on the more remote electrodes Nos. 3 and 4. Likewise the sharp cutoff characteristic of the device of Figure 23 and shown in Figure 24 refers to electrode No. 4, an outer electrode, whereas the corresponding characteristic in Figure 22 refers to the inner electrode No. 2 of Figure 21. In the device of Figure 23 the critical potential of the No. 1 electrode is positive, and Figure 24 shows that this transference of transconductance from one electrode to another may be made to occur at a positive potential of the No. 1 electrode.

Figure 25 shows a device of this type connected to a utilization circuit and so made that the critical potential of the No. 1 electrode occurs at a negative bias on No. 1. The occurrence of the critical potential of No. 1 in the negative range is achieved by making either the No. 1 wires 95 smaller or the slats 96 narrower, or both, than in Figure 21. As shown in Figure 25, the No. 1 electrode is biased negatively and the input circuit changes in the potential of this electrode are within the negative range. The No. 4 electrode is the output circuit electrode connected to a suitable load circuit.

Figures 26 and 27 are expanded views showing forms of a tubular No. 2 electrode suitable for use in the tubes shown in Figures 23 and 25, made by punching a metal sheet 100. The beam falling on the slat is indicated by the rectangle in dotted lines. Figure 26 shows the slats with rectangular openings between them, giving curves of the general character shown in Figure 24. Figure 27 shows vanes 101 interposed between the slats 96 and shaped in such a way as to obstruct part of the beam when the width of the latter becomes greater than a certain amount. As the beam width increases, these vanes 101 obstruct an increasingly large percentage of the beam cross section. In this way the shape of the characteristic of the No. 4 electrode can be arbitrarily modified by arbitrarily shaping the vanes 101. In the absence of such vanes, the current characteristic of the No. 4 electrode in Figure 23 normally rises with increasing rapidity from the zero axis, but if the vanes 101 in Figure 27 are correctly shaped, the excess current from No. 4 over that necessary to produce a linear characteristic is transferred to electrode No. 2, as indicated in Figure 28. In this case, the electrode No. 2, made as in Figure 27, obstructs portions of the beam at several different cross sections, and by this means produces a No. 4 to No. 1 characteristic which, as shown in Figure 28, has sharp cutoff, high transconductance, and is linear, and will cause the voltage impulses across the output circuit to be strictly in proportion to the voltage impulses on the input electrode.

In accordance with my invention, electron emission devices can be constructed having a negative conductance characteristic dependent neither upon secondary emission nor upon the existence of virtual electron sources. In such devices the negative resistance characteristic can be made to be substantially as constant as the dimensions of the device and dependent solely upon the shapes, positions and voltages of the various electrodes. In such devices increments of potential on the work electrode which is to have a negative conductance may cause a beam which has been focused on that electrode to become defocused and thus pass by that electrode to a rejector electrode at some positive potential. Another form of negative conductance electrode may have an opening situated in the median plane of the beam so that when the potential of that electrode rises, the beam becomes focused entirely on the opening in the electrode, whereby the current to that electrode is reduced to substantially zero. A negative conductance electrode to function in this manner must be preceded by another and perforated electrode which must be at a positive potential so that a rise of potential on the negative conductance electrode causes a convergence or focusing of the beams proceeding through the openings of the preceding positive electrode. A negative conductance electrode operating on a slightly different principle may be placed in such a position as to cause the median plane of a beam which impinges upon it at one potential to be deflected by a sufficient rise in its potential so as to impinge partially or wholly upon another electrode.

Some of the embodiments of my invention in negative resistance tubes are shown diagrammatically in the accompanying drawings in which Figure 29 shows one form of device of the construction shown in Figure 21 and connected to the focusing and defocusing of a beam on a work electrode to obtain negative conductance to that electrode. In this device each of two beams produced by a beam forming structure such as shown in Figure 21 is directed toward one or two straight rods of small diameter, such as 0.015 inch, lying in the median plane of the beams and constituting the negative conductance electrode No. 3. Electrode No. 4, or box 93, when at a low positive, zero, or negative potential produces in conjunction with the No. 2, which is at a positive potential, an electrostatic field of such a kind in a device of the relative proportions shown that, at a particular potential of No. 3, the beams are focused accurately upon the rods 92. As the potential of No. 3 is raised above its critical value the electrostatic field is changed thereby in such a way that the focus of the beams is no longer on No. 3, but beyond it and between it and No. 4, which results in the return through orbital paths, as indicated by the outermost broken lines in the figure, of most of the current represented by the beams to the electrode No. 2, which now acts as a rejector electrode, hence the current in No. 3 is decreased by rise of its potential and it has a negative conductance.

The peak of the volt ampere characteristic of electrode No. 3 corresponds, as shown in Figure 30, to the critical potential at which focus on No. 3 occurs and the falling portion of the curve corresponds to the recession of the focus of the beams toward No. 4 from No. 3. The fact that the falling of this observed characteristic of No. 3 occurs while No. 3 is at a higher potential than any other electrode in the device, proves that this falling characteristic is not due to a loss of secondary electrons from No. 3. I have observed and it is well known that the loss of secondary electrons from a bombarded electrode always decreases as the potential of such electrode is raised above that of the collector to which such secondary electrons are lost from the bombarded electrode. The decrease of current to No. 3 electrode resulting from an increase of its potential is produced entirely by the effect of the increase of the voltage of No. 3 upon the electrostatic field through which the beam passes and upon the location of the focus of that beam. No change of potential on any other electrode in the device is involved in the production of this characteristic.

Figure 31 shows a device with a beam forming structure of the same kind as in Figure 29, and with a No. 3 or negative transconductance electrode 105 situated entirely out of the plane determined by the cathode and the center lines of the slits in No. 2. Adjacent this electrode is a more remote No. 4 or rejector electrode 106, and a No. 5 electrode or tubular member 107 surrounds the other electrodes and is at a low positive, zero, or negative potential. The electrons composing the beams are diverted after leaving the openings in No. 2 into arcuate paths causing them to arrive either on No. 3 or on the more remote electrode No. 4. At a certain critical potential of No. 3 it is found that the beams impinge entirely on some parts of No. 3, that at a higher potential of No. 3 the beams impinge on parts more remote from the beam forming structure, and that at a sufficiently high potential on No. 3 the beams miss it entirely and arrive on No. 4. Thus a sufficient rise of potential on No. 3 causes its current to fall substantially to zero by being diverted to No. 4. Figure 32 shows curves of this device with the critical potential on No. 3 about 120 volts positive, and evidently the succeeding falling portion of the No. 3 volt ampere characteristic occurred while the potential on No. 3 was higher than that of any other electrode in the device. The corresponding and simultaneous rise of the current diverted to No. 4 is also shown in Figure 32. The beam behavior in the device of Figure 31 which gives rise to the negative transconductance of No. 3 is due to the effect that the rise of potential on No. 3 has in lengthening the trajectory of the electrons emerging from the slits in No. 2. The behavior of the beam traces on Nos. 3 and 4 and the beam paths observed when gas is present in this device correspond to the above explanation. I have found the electrode 3 may be cylindrical, so that the field of electric force between it and No. 5 is substantially radial except near the No. 2 and No. 4 electrodes.

The arcuate beam type of tube disclosed in Figs. 31 and 32 of this application is claimed in a continuation in part, Serial No. 232,805, filed October 1, 1938, and entitled Electron beam discharge device.

Figure 33 shows a negative conductance device with a beam forming structure of the type of Figure 9, but modified to produce a single beam. The No. 1 electrode 110 and the No. 2 electrode 111 each have only one slot or opening, to produce a single beam of rectangular cross section. Preferably placed symmetrically with respect to the plane determined by the cathode axis and the center line of the opening in 111 and in the path of the beam are electrodes No. 3 and No. 4 comprising plates 112 and 113 set edge to edge and deflecting vanes 114 and 115 which are connected to and may well be integral portions of the plates 112 and 113 respectively. The deflecting vanes are placed between the plates 112 and 113 and the beam forming structure and symmetrically positioned on opposite sides of and out of the beam path, the plate 112 and its deflecting vane 114 being on opposite sides of the median plane of the beam path and the plate 114 and its deflecting vane 115 being similarly related. If desired, a screening grid 116 with its elements transverse to the median plane of the beam may be placed in front of the plates 112 and 113.

Figure 34 shows an illustrative curve of this device. When both electrodes No. 3 and No. 4 are at a common potential of Figure 34, they receive equal portions of the electron beam. At a higher potential than Q on No. 3 its deflecting vane 114 is more positive than vane 115 and the beam is deflected toward 114 onto plate 113 and away from plate 112, resulting in a lower current to No. 3, as shown in Figure 34, and therefore in a negative conductance of No. 3. Conversely a lower potential than Q on No. 3 causes a deflection of the beam toward 115 and onto No. 3, increasing the current to the latter, as shown in the volt ampere characteristic of No. 3 in Figure 34.

The electric field between the deflecting vanes 114 and 115 tends to cause the described deflection, while that between the plates 112 and 113 opposes such tendency. For this reason the vanes 114 and 115 should be sufficiently close together and of sufficient extent so that the deflecting tendency of their electric field predominates over that of plates 112 and 113. The screening grid 116 diminishes the adverse effect of the field between the vanes and the plates, and such screening electrode may be at a low or zero potential whereby the undesirable exchange of secondary electrons between 112 and 113 and from them to vanes 114 and 115 is reduced or eliminated. The No. 3 and No. 4 electrodes may be placed at different distances from the cathode, and their edges may be shaped in such a way as to alter the rate of transfer of current from one of them to the other and thus produce either a strictly linear negative conductance characteristic or special characteristics desired for any purpose.

While I have illustrated my invention as embodied in tubes having equipotential cathodes, I am not restricted to the use of such cathodes, as filamentary cathodes, either single strand or of several parallel sections, may be used. Cathodes with adjoining emitting and non-emitting areas are more easily produced of the indirectly heated type, but equivalent structures can be produced with filamentary cathodes.

I claim:

1. A screen grid electron discharge tube comprising a tubular anode, a cathode coaxial with said anode, a unipotential control grid adjacent and surrounding said cathode, and comprising a plurality of conductors spaced to provide a plurality of radial openings, a unipotential screen grid surrounding said control grid and interposed between said control grid and said anode and comprising spaced flat ribbon conductors, each positioned edgewise to and in radial alignment with a corresponding conductor of said control grid to form radial openings in registry with the openings in said control grid.

2. An electron discharge device comprising an electron beam forming structure comprising a thermionic cathode and means for forming the electron discharge from said cathode into a plurality of beams, a grid electrode having spaced conductors positioned on opposite sides of the paths of said beams to form openings through which said beams pass, and a plurality of electrodes, each positioned opposite an opening in said grid electrode and in the path of a beam passing said grid electrode and of substantially the same size as said opening in said grid electrode.

3. An electron discharge device comprising means including an electrode having rectangular openings for forming electron beams rectangular in cross section and varying the cross section of said beams, electrodes mounted opposite said openings and in the path of said beams and of a projected area less than the area of the corresponding openings in the first electrode, and another electrode beyond said first electrodes and in the paths of said beams.

4. An electron discharge device comprising a single cathode, means including spaced parallel conductors for forming an electron discharge from said cathode into a plurality of beams of rectangular cross section and for simultaneously varying the cross section of said beams, electrodes mounted opposite the openings between said conductors and in the path of said beams and each having a projected area less than the area of the corresponding opening between said conductors, said electrodes being shaped in a direction transverse to said beams to impart a desired characteristic to current flow to said electrodes, and other electrodes beyond said first electrodes and in the paths of said beams for collecting the portion of said beams which escape the first electrodes.

5. An electron discharge device comprising a single cathode, means including a beam forming electrode having rectangular openings for forming the electron discharge from said cathode into electron beams rectangular in cross section, and varying the cross section of said beams, a unipotential electrode surrounding said means and having openings of a size less than the projection of said cathode through the opening in said beam forming electrode on the surface of said unipotential electrode, and a current receiving electrode in registry with said openings.

6. An electron discharge device comprising a cylindrical thermionic cathode, a pair of beam forming electrodes parallel to and on opposite sides of said cathode, a cylindrical electrode surrounding said beam forming electrodes and having a slot in a plane normal to the plane of said beam forming electrodes, a work electrode in alignment with said slot, and an outer electrode enclosing the other electrodes.

7. A negative conductance electron discharge device comprising means for segregating an electron discharge into a rectangular section beam, a work electrode, and a rejector electrode mounted side by side and transverse to the path of said beam, deflecting means responsive to potential for deflecting said beam from said work electrode toward the other electrode, and an electrical connection between said deflecting means and said work electrode to impress on said deflecting means the potential of said work electrode.

8. A negative conductance electron discharge device comprising means for producing an electron beam rectangular in cross section, a pair of current receiving electrodes mounted edge to edge in the path of said beam, a deflector directly connected to one of said electrodes and mounted adjacent to and on the opposite side of said beam path from said electrode, and means for connecting said current receiving electrode to a work circuit.

9. An electron discharge device comprising a cylindrical thermionic cathode, a pair of grid electrodes coaxial with said cathode and with each other, and each comprising a conductor constructed to have side by side a plurality of portions spaced to leave openings thru said grid, the spaced portions of the conductor of one grid being disposed transversely of the conductor of the other grid.

10. A negative conductance electron discharge device comprising means for forming an electron beam, an electrode comprising conductors on opposite sides of the path of said beam for focusing and defocusing said beam, a work electrode opposite and smaller than the opening between said conductors, and a collector electrode behind and further from said cathode than said work electrode and having transverse to said beam an area greater than the area of the opening between said conductors.

11. An electron discharge device comprising a rectilinear cathode, an output electrode, a unipotential beam forming electrode comprising a plurality of rectilinear conductors adjacent and parallel to said cathode and spaced to form the electron discharge from said cathode into a plurality of beams rectilinear in cross-section, and rectilinear current receiving electrodes equal in number to said conductors and parallel to said cathode and each opposite the space between two of said conductors of said beam forming electrode and smaller than the projection on said output electrode of the cathode through said space between said two conductors.

12. An electron discharge device comprising a rectilinear thermionic cathode, a beam forming electrode comprising a pair of rectilinear conductors adjacent and parallel to said cathode and spaced to provide two elongated gaps between their longitudinal edges, a pair of rectilinear current receiving electrodes parallel to and on opposite sides of said cathode and each opposite a gap between said conductors, and an output electrode having current receiving portions opposite the gaps between said current receiving electrodes.

13. An electron discharge device comprising a cylindrical rectilinear thermionic cathode, a cylindrical anode coaxial with and surrounding said cathode, a beam forming electrode adjacent said cathode and comprising a plurality of rectilinear conductors parallel to said cathode and lying in a cylindrical surface surrounding said cathode and spaced to provide elongated gaps between said conductors, and a plurality of rectilinear current receiving electrodes parallel to said cathode and lying in a cylindrical surface surrounding and coaxial with said beam forming electrode, each of said current receiving electrodes being opposite a gap between said conductors.

14. An electron discharge device comprising a rectilinear cathode, a collector electrode, a beam forming electrode including a plurality of spaced rectilinear conductors adjacent and parallel to said cathode for forming an electron discharge from said cathode into a plurality of beams of rectangular cross-section and for simultaneously varying the cross-section of said beams, and a plurality of current receiving electrodes between said collector electrode and said beam forming electrode, each of said current receiving electrodes being opposite an opening between two of said conductors and in the path of the beam through said opening and smaller than the projection of said cathode through said opening on said collector electrode, the edge of said electrode passed by said beam being irregular to impart a desired characteristic to current flow to said electrodes and to said collector electrode.

15. An electron discharge device comprising a rectilinear cathode, an anode surrounding and coaxial with said cathode, beam forming electrodes comprising a plurality of conductors adjacent and parallel with said cathode, collector electrodes equal in number to said conductors and adjacent and parallel with said cathode and so spaced with reference to each other and to said conductors of said beam forming electrode that portions of said cathode surface between said conductors of said beam forming electrodes are directly exposed to said anode.

16. A negative conductance electron discharge device comprising means for segregating an electron discharge into a rectangular section beam, a work electrode mounted in the normal path of said beam, a deflection electrode beside the path of said beam for deflecting said beam from said work electrode, an electrical connection between said deflection electrode and said work electrode to impress on said deflection electrode the potential of said work electrode, and means for connecting said work electrode to a work circuit.

17. A negative conductance electron discharge means for producing an electron beam rectangular in cross-section, a pair of current receiving electrodes mounted side by side and transverse to the path of said beam, a pair of deflection electrodes spaced to permit the beam to pass between them to said current receiving electrodes, a direct electrical connection between each of said current receiving electrodes and the deflection electrode on the opposite side of the beam to the current receiving electrode, and means for connecting one of said current receiving electrodes to a work circuit.

HARRY C. THOMPSON.